US008421595B2

(12) United States Patent
Cassone

(10) Patent No.: US 8,421,595 B2
(45) Date of Patent: Apr. 16, 2013

(54) METHOD, DEVICE, SERVER AND SYSTEM FOR IDENTITY AUTHENTICATION USING BIOMETRICS

(75) Inventor: Jean Cassone, Beijing (CN)

(73) Assignee: Valley Technologies, LLC, Wilmington, DE (US)

( * ) Notice: Subject to any disclaimer, the term of this patent is extended or adjusted under 35 U.S.C. 154(b) by 809 days.

(21) Appl. No.: 12/308,995

(22) PCT Filed: Jun. 26, 2007

(86) PCT No.: PCT/CN2007/001992
§ 371 (c)(1),
(2), (4) Date: Oct. 29, 2009

(87) PCT Pub. No.: WO2008/006290
PCT Pub. Date: Jan. 17, 2008

(65) Prior Publication Data
US 2010/0049659 A1   Feb. 25, 2010

(30) Foreign Application Priority Data

Jul. 5, 2006   (CN) .......................... 2006 1 0090945

(51) Int. Cl.
*G05B 19/00*   (2006.01)
*G05B 23/00*   (2006.01)
*G06F 7/00*   (2006.01)

(52) U.S. Cl.
USPC .............................. 340/5.82; 340/5.6; 340/5.8

(58) Field of Classification Search ............... 235/382.5; 340/5.26
See application file for complete search history.

(56) References Cited

U.S. PATENT DOCUMENTS

| 6,067,621 A * | 5/2000 | Yu et al. ........................ 713/172 |
| 2003/0219129 A1* | 11/2003 | Whelan et al. ................ 380/270 |
| 2004/0098609 A1* | 5/2004 | Bracewell et al. ............ 713/200 |
| 2004/0172531 A1* | 9/2004 | Little et al. .................... 713/155 |
| 2004/0188519 A1* | 9/2004 | Cassone ........................ 235/382 |

FOREIGN PATENT DOCUMENTS

| CN | 1696966 A | 11/2005 |
| CN | 1696967 A | 11/2005 |

* cited by examiner

*Primary Examiner* — Daniel Wu
*Assistant Examiner* — Frederick Ott
(74) *Attorney, Agent, or Firm* — Squire, Sanders (US) LLP

(57) ABSTRACT

A method, a device, a server and a system for authenticating the identity with the biological character in an authenticating system, the authenticating system at least includes a local device and an authenticating server, wherein the method comprises the following steps: inputting step, inputting the biological character data in the local device by a biological character sensor; matching step, matching the input biological character data with the original biological character data pre-stored in the memory of the local device; first identification code producing step, producing the first identification code in the local device if the input biological character data is matched with the original biological character data pre-stored in the memory; and authenticating step, sending the first identification code to the authenticating server, authenticating the first identification code by the authenticating server in order to authorize the system to perform the authorized operation.

13 Claims, 6 Drawing Sheets

METHOD, DEVICE, SERVER AND SYSTEM FOR IDENTITY AUTHENTICATION USING BIOMETRICS

FIELD OF THE INVENTION

The present invention relates to the field of biometric and dynamic authentication, and particularly to a method, a device, server and a system for a person's identity authentication using biometrics and dynamic PIN code to execute an action/operation.

BACKGROUND OF THE INVENTION

In a typical banking transaction authentication scenario, after the holder or the cashier swipes the banking card through a reader, the EDC (Electronic Data Capture) software at the POS (point-of-sale) terminal dials a stored telephone number via a modem to call an acquirer. An acquirer collects credit-authentication requests from merchants and provides the merchants with a payment guarantee. When the acquirer gets the banking-card authentication request, it checks the recorded data on the magstripe of the banking card for: Merchant ID, Valid card number, Expiration data and Credit limit. Single dial-up transactions are typically processed at 1,200 to 2,400 bits per second (bps), while direct Internet attachment may use much higher speeds via this protocol. In this system, the cardholder may enter a PIN (personal identification number) code, which is, for example, a password set by the user when opening the account, (or account password) using a keypad or other similar input device, though many transactions are done without use of the PIN. For example, before getting cash from an ATM, the ATM typically encrypts the Pin entered and sends it to a remote database to see if there is a match. During the whole process, PIN codes are "static", i.e. the same PIN codes are used for several months, if not years. Due to the popularization of on-line transactions, banking accounts and PIN codes will be easily thieved or stolen. Thus, there is a strong weakness in the existing electronic banking transaction process using a static PIN code.

On the one hand, since only static PIN codes pre-set by users are present in the existing credit-card transaction mode, during setting static PIN codes, users need to increase the complexity of PIN codes which must be easy to memorize, in order to avoid leakage of privacy. If users want to re-set static PIN codes or forget static PIN codes, they must go to the card issuer's bank outlet for pertinent transaction, thereby great inconvenience. Additionally, users usually set the same codes for different banking cards, thereby reduction of privacy. If users set different codes for different banking cards, then how to effectively record or memorize these codes will become a thorny problem.

On the other hand, the existing banking system typically uses magnetic cards for electronic transactions, and the magnetic card records account information and other user information via the magstripe, which can be easily read, or a magnetic card on which the same information is recorded can be easily made in accordance with the account information. As a result, the user's account is stolen. One solution for enhancing security is to replace magnetic cards with smart IC cards. Due to the extensive use of magnetic cards, if magnetic cards are replaced with IC cards, then all the existing magnetic cards and magnetic-card readers must be replaced with IC cards and IC-card readers. Apparently, such solution demands huge costs and are even infeasible. Therefore, there is a wish to enhance the transaction security on the basis that no alteration is made to the existing worldwide infrastructure used for the magnetic tape card reading of the data and its transmission over the network.

SUMMARY OF THE INVENTION

An object of the present invention is to provide a dynamic identity authentication solution so as to enhance the privacy and security of electronic transactions in the situation that the existing electronic transaction system is changed to a minimal extent.

Another object of the present invention is to provide a portable identity authentication device and corresponding authentication server and system so as to enhance the convenience of electronic transactions.

In order to achieve above-mentioned objects and other objects, according to the first aspect of the present invention, there is provided a method for identity authentication using biometrics in an authentication system that at least comprises a local device and an authentication server, wherein said method comprises: an input step of inputting biometric data into said local device via a biometric sensor; a match step of matching said inputted biometric data with original biometric data pre-stored in a memory of said local device; a first identification code generation step of generating a first identification code in said local device if said inputted biometric data is matched with said biometric data pre-stored in the memory; and an authentication step of sending said first identification code to the authentication server so that the authentication server authenticates said first identification code to authorize said system to perform authorized operations.

According to the second aspect of the present invention, there is provided a device for identity authentication using biometrics, comprising: a memory for pre-storing original biometric data; a biometric sensor for receiving inputs of biometric data; match means for matching the biometric data inputted through the biometric sensor with the biometric data pre-stored in said memory; and first identification code generation means for generating a first identification code if said inputted biometric data is matched with said biometric data pre-stored in said memory.

According to the third aspect of the present invention, there is provided A server for identification authentication, comprising: input means for receiving an authentication request, static data and a first identification code to be authenticated; second identification code generation means for generating a second identification code based on the static data upon receipt of the authentication request; comparison means for comparing the received first identification code with the generated second identification code; and sending means for returning authorization information if a comparison result of said comparison means indicates that the first identification code is matched with the second identification code, otherwise rejecting authorization.

According to the fourth aspect of the present invention, there is provided a system for identification authentication using biometrics, wherein said system comprises above-mentioned device and above-mentioned server.

These and other functions, modifications and advantages will become more apparent from the following detailed description of preferable embodiments of the present invention, when taken in conjunction with the accompanying drawings.

BRIEF DESCRIPTION OF THE DRAWINGS

Throughout the following accompanying drawings, like reference numerals designate the same devices or apparatuses.

DETAILED DESCRIPTION OF PREFERRED EMBODIMENTS

To facilitate a quicker understanding of the present invention, the following will be described in terms of banking card applications of the present invention. However, it is to be understood that the present invention may be used for other fields, including, but not limited to, card activator, E-Commerce, E-purse, personal identification device, external system access control, ID card and social security card reader, electronic safe etc.

Figure 1:
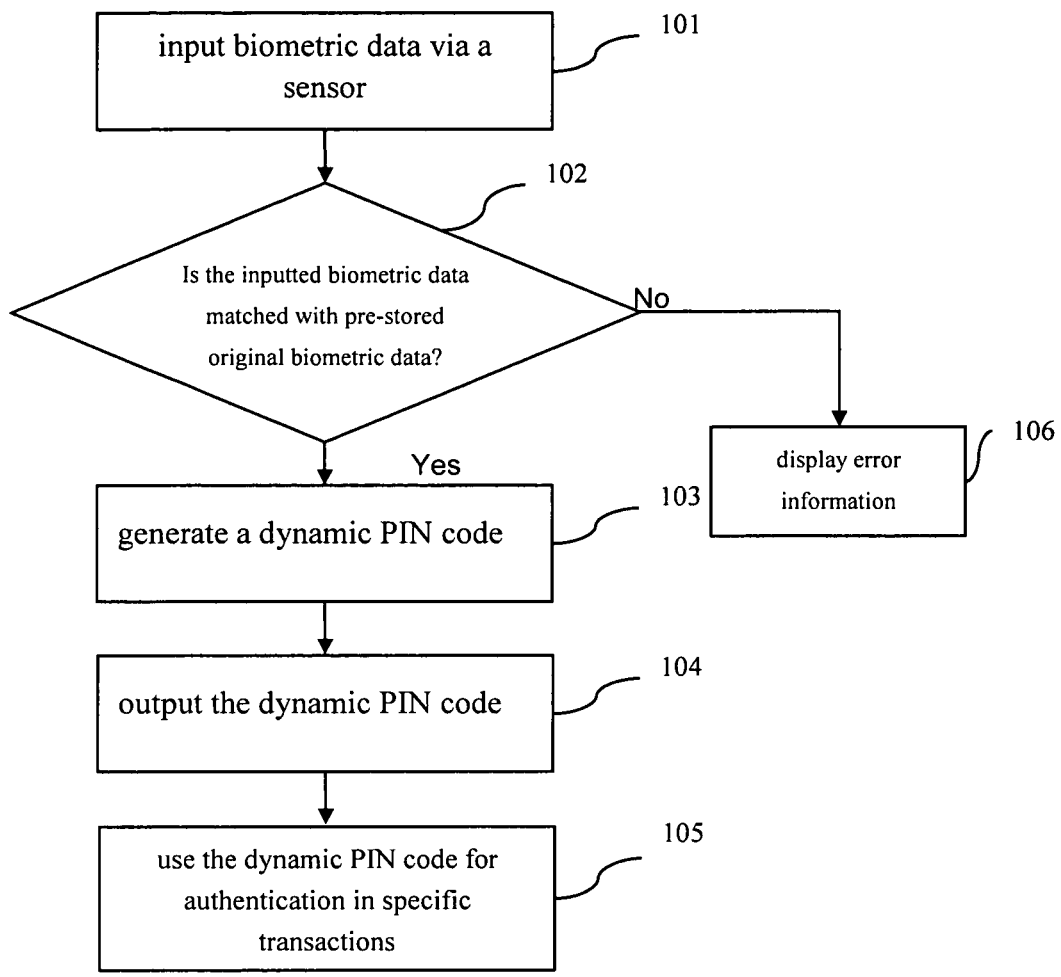
FIG. 1 is a flowchart of a method according to an embodiment of the present invention.

Hereinafter, the method of the present invention will be described in terms of banking cards and with reference to FIG. 1. In step 101, a cardholder inputs biometric data through a biometric sensor, such as a fingerprint sensor. Other forms of biometric sensors may also be used, such as iris sensors, palmprint sensors, voice sensors, handwriting sensors, speech sensors and subcutaneous veins sensors. In one embodiment, the biometric sensor may be a CMOS dactyloscopic scanner designed for 1:1 fingerprint authentication. The TCEBA TOUCHCHIP® Fingerprint Biometric Subsystem from the STMicroelectronics Group and the MORPHOMODULE™ from Groupe SAGEM are examples of such biometric sensors, although other biometric sensors such as ATMEL AT77C104B-CB08YV may be used. The fingerprint scanner may also be designed for 1: n fingerprint identification. Optical, capacitive, and other types of fingerprint scanners may be used.

In step 102, the inputted biometrics is compared with pre-stored biometrics. If there is a match, then the process goes to step 103. If no match is found in a predetermined time (typically dozens of seconds), then the process goes to step 106.

In step 103, a dynamic PIN code is generated using a dynamic PIN algorithm so that the dynamic PIN code can be used in transactions. The dynamic PIN algorithm will be described in detail below. For example, the existing Visa/IBM, triple DES (data encryption standards) encryption and PKI (public key infrastructure) encryption schemes may be used. In a local device, the dynamic PIN code is generated by using the above existing algorithm and using constant user data (or called static data), which are associated with users and include accounts, initial PIN codes and device MAC addresses etc, as well as current time and other information as parameters. In one embodiment, in the local device there is a timer for providing current time information. The timer keeps consistent with the timer of a DPAS (dynamic PIN code authentication server) on the server side (automatic PIN code authentication system). That is, an error between them is small enough to ensure that the DPAS on the server side authenticates the dynamic PIN code generated by the local device.

The dynamic PIN mentioned here means that the PIN code generated by using the dynamic PIN algorithm each time might be different from each other. This is because that the dynamic PIN algorithm uses changing current time as parameters, and if current time when a PIN code is generated, the generated PIN code might change as well. In order to ensure that the local device and the server side can generate the same PIN codes for authentication, they are required to use the same dynamic PIN algorithm, the same static parameters and like time parameters to generate dynamic PIN codes. For example, the DPAS on the server side generates a dynamic PIN code in accordance with current time and then matches the generated PIN code with a PIN code generated by the local device, so as to achieve authentication.

The current time mentioned here may be an absolute time when the PIN code is generated or a relative time of this point with respect to a specific point. Moreover, the current time may also be a certain moment close to the moment when the PIN code is generated. For example, the current time is a moment obtained by rounding the moment when the PIN code is generated to minutes or to integral 5 minutes. That is, suppose the moment when the PIN code is generated is 3:47, then this moment may be rounded to 3:45 for use as the current time of the generation of the PIN code.

Figure 8:
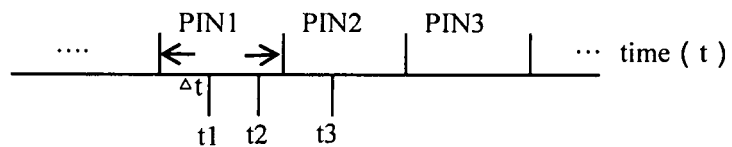
FIG. 8 is a schematic view illustrating the generation principle of a dynamic PIN.

Referring to FIG. 8, the principle of performing authentication using a dynamic PIN code will be further illustrated. As shown in FIG. 8, suppose the time axis is divided into a plurality of time slices with a fixed time interval. During the generation of a dynamic PIN code by using the dynamic PIN algorithm and based on static parameters and current time, it is required that PIN codes generated in the same time interval be identical to each other while PIN codes generated in different time intervals be different from each other. As shown in FIG. 8, suppose PIN codes generated in three time intervals are PIN1, PIN2 and PIN3, respectively. If the local device generates a PIN code at a moment t, since t1 falls into the range of the first time interval, then PIN1 is generated. When the PIN1 code is used for authentication, the DPAS on the server side generates a dynamic PIN code based on static data and current time upon receipt of an authentication request. Due to the time delay during the process of requesting authentication, suppose the server generates the dynamic PIN code at a moment t2 after t1, the server also generates the PIN1 code, since t2 falls into the first time interval like t1. Since the PIN1 code requesting authentication is the same as the PIN code generated by the server, authentication can be achieved so as to authorize subsequent operations, such as banking transactions, e-commerce transactions or membership authentication and login. However, if the time of requesting authentication is delayed too long, then the moment when the DPAS on the server side generated the PIN code and the moment when the local device generated the PIN code fall into different time slices. For example, the DPAS on the server side generates a dynamic PIN code at a moment t3, i.e. PIN2. Then, it is decided that the PIN codes generated on these two sides do not match with each other, i.e. authentication fails. Preferably, if the time interval between two PIN codes generated successively is larger than a predetermined time interval, then the generated PIN codes are different from each other. Preferably, the value of said predetermined time interval ranges between 1 and 5 minutes.

Consideration is now given to a critical situation. For example, moments t1 and t2 belong to different time slices, but they are quite close to each other, for instance, t1 is at the end of the first time interval while t2 is at the beginning of the second time interval. Then, the following solution may be preferably adopted during the authentication process: first, the server will compare the PIN2 generated at a current moment with the PIN1 generated at the moment t1 as provided by the user. If no match is found, then the server will generate a PIN code once more by using the time, which is obtained by subtracting the length of said time slice Δt from the current moment t2, as a parameter for the generation of PIN code. If t2 belongs to the time interval next to t1, and the time obtained by subtracting the length of the time interval from t2 is a certain moment within the previous time slice, i.e. falls into the same time slice as t1, then the PIN code generated based on this modified time parameter must be consistent with the PIN code generated at the moment t1 as provided by the user. If there is a match at this point, then it is decided that authentication is passed. Besides this, other similar modes may also be used to solve the above critical problem.

Why PIN codes generated in different time slices are provided to be different from each other is to demand the user to perform PIN authentication in several minutes after a PIN code is generated in the local device. Otherwise, if the time is delayed too long, then the PIN code generated lately becomes invalid and a PIN code needs to be generated again. That is to say, each PIN code generated in such manner is provided with a short term of validity, so that lawbreakers are prevented from thieving PIN codes and stealing users' accounts for transactions.

In step 104, the generated dynamic PIN code may be preferably displayed in a display, and the user inputs the PIN code for authentication in an ATM, a bank counter and a member login interface on manual. The user may also send the generated PIN code to the authentication system via an external interface such as a USB interface or a wireless interface such as infrared, Bluetooth, WLAN and RFID.

In step 105, the user uses the generated PIN code in a specific electronic transaction. In step 106, "Invalid fingerprint" may be displayed in a display. Alternatively, another visual or audible alert may be used to signal failure of the generation of PIN code.

Figure 2:
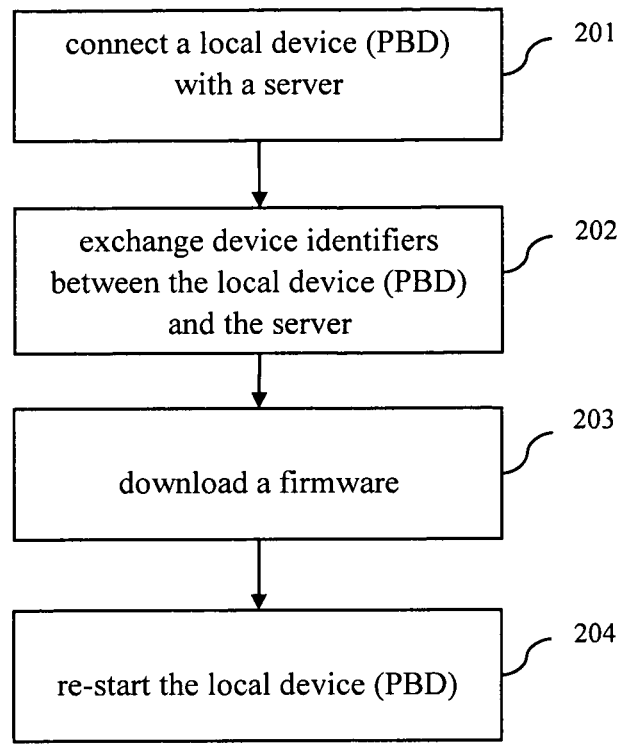
FIG. 2 is a flowchart of an initialization step according to the present invention.
Figure 3:
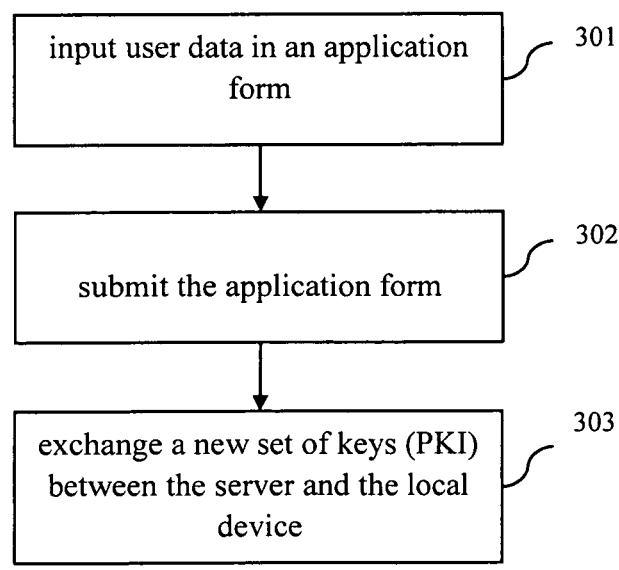
FIG. 3 is a flowchart of a registration step according to the present invention.
Figure 4:
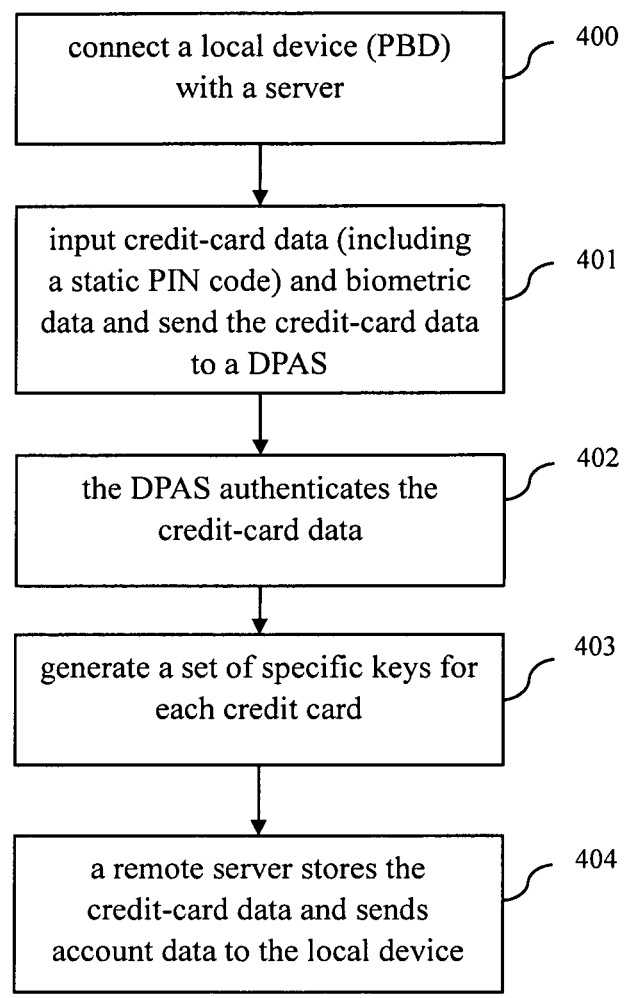
FIG. 4 is a flowchart of an enrollment step according to the present invention.

Preferably, prior to the performance of the specific authentication step described with reference to FIG. 1, an initialization step, a registration step and an enrollment step as shown in FIGS. 2, 3 and 4, respectively, need to be performed so as to synchronize user-related account information, keys needed for the generation of the dynamic PIN code, identifiers of the local device generating the dynamic PIN code as well as the timer in the local device with those in an authentication server.

FIG. 2 is a schematic flowchart of the initialization step. In step 201, the local device is connected with the authentication server via a network. In step 202, the local device exchanges genuine verification values with the server, such as the MAC address of the local device.

In one embodiment, the authentication server requests the MAC address to the local device. Then, the local device sends its MAC address to the authentication server. Upon receipt the MAC address of the local device, the authentication server looks up the MAC address in its device database. Optionally, if the MAC is not contained in the device database, then verification fails, and the local device will clear its memory and close communications with the authentication server, showing a message such as "Invalid device" in its display. In another embodiment, if the local device ID, the MAC address for example, is not contained in the device database of the authentication server, then the authentication server will add the local device to its device database and complete verification. The MAC address may serve as static data for the generation of the dynamic PIN.

In step 203, the local device downloads a firmware from the authentication server. Finally, in step 204, the local device re-starts so as to use the updated firmware.

FIG. 3 is a schematic flowchart of the registration step. In step 301, the user inputs user data in a web application form, for example. In step 302, the user submits the application form to the authentication server by pressing the "send" key, for example. In step 303, the authentication server exchanges a new set of keys (such as PKI) with the local device. The set of keys may also serve as static data for the generation of the dynamic PIN.

FIG. 4 is a schematic flowchart of the enrollment step. In step 400, the local device is connected with the authentication server via a network. In step 401, the user inputs into the local device card data (such as including the static PIN code) and the biometric data into or other data in accordance with needs and sends the card data to the authentication server. In step 402, the DPAS of the authentication server verifies the card data. In step 403, the remote server generates a set of specific keys for each card. In step 404, the authentication server stores the card data in a separate database which may be different from the foregoing device database and can send one or more account data to the local device.

Figure 5:
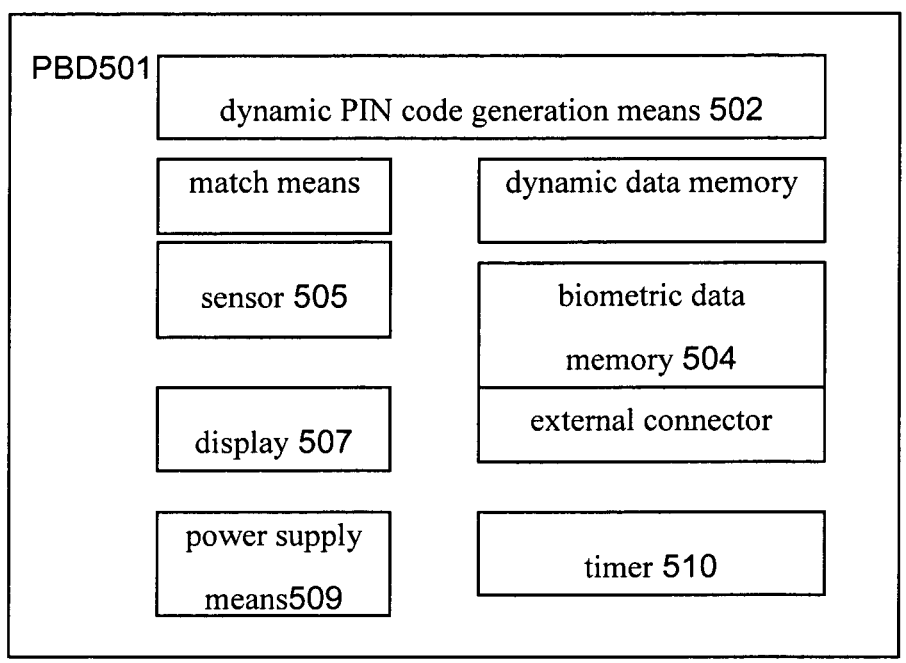
FIG. 5 is a schematic view of a device according to an embodiment of the present invention.

FIG. 5 is a schematic view of a device according to an embodiment of the present invention. As shown in this figure, a PBD 501 (personal biometric device) is the device of the present invention. The PBD 501 comprises: dynamic PIN code generation means 502, match means 503, a biometric data memory 504, a biometric sensor 505, a static data memory 506, a display 507, an external connector 508, a power supply unit 509 and a timer 510. It is to be understood that these means as shown in FIG. 5 are merely for the purpose of illustration and are not intended to limit the present invention.

The match means 503 is used to match biometric data inputted from the biometric sensor 505 with original biometric data pre-stored in the biometric data memory 504. Preferably, the match means 503 runs a software or firmware program for the acquisition and analysis of biometrics.

If the match done by the match means 503 succeeds, then the dynamic PIN code generation means 502 generates the dynamic PIN code based on static data pre-stored in the static data memory 506 and current time provided by the timer 510.

As seen from the above PIN code generation and authentication principle described with reference to FIG. 8, the time information used by the dynamic PIN code generation means 502 for the generation of the PIN code must be consistent with the time information provided on the server side. That is to say, an error between the time information provided by the timer 510 of the PBD 501 and the time information provided by the timer in the authentication server at the same moment is so small as to be omitted.

One embodiment of the biometric sensor 505 is a fingerprint sensor. The static data memory 506 is for storage of static data which usually does not change with time, such as account data, user name, the PBD's MAC address and set of keys for the generation of the dynamic PIN code. The display 507 is used to display the dynamic PIN code or error information for example, or it may display other data in accordance with needs. Preferably, the display 507 is a liquid crystal type display, although other display types can be used. In one embodiment, the display 507 may be a 1-line display. Other sizes of displays may also be used. The external connector 508 may also be another type of wired connector (such as a serial, parallel or Firewire port) or a wireless connector for Bluetooth or other wireless communication.

The power supply means 509 is used to supply a power for the PBD 501, and it may be a rechargeable battery, for example. The power supply means 509 may further comprise a main battery and a standby battery. Usually, when the main battery is effective, the main battery supplies the power to complete biometric data inputting, biometric data matching, dynamic PIN code generating and outputting as well as all other operations. When the main battery becomes ineffective or the PBD 501 is switched off, the standby battery maintains the lowest power consumption, such as keeping the successive timing of the timer and keeping the storage of biometric data and static data. However, operations such as biometric data inputting, biometric data matching, dynamic PIN code generating and outputting cannot be performed. Since the standby battery merely needs very low power consumption to maintain the status of the local device, it can be used for years without being charged or replaced.

The device according to the present invention may further comprise a keypad (not shown), similar to keypad areas of a basic calculator including the 10 digits from 0 to 9. The keypad may further include the four basic operators for addition, subtraction, multiplication and division, the equal sign or the like. Other keys or types of data entry features or arrangements of features may be used. The PBD may be switched on and off with a dedicated on/off button (see FIG. 3) or automatically by touching the biometric sensor.

The biometric sensor 505, when coupled with a logic circuit to compare the sensed fingerprint to the stored fingerprint, should preferably successfully match fingerprints no matter how the finger is placed on the sensor 505, including smudged prints.

Although shown as separate components 502-510, these components may be further integrated onto one or more integrated circuits or further separated into separate modules as convenient or desired for manufacturing or other reasons.

The cardholder data is stored inside the PBD at the enrollment stage, which associates the debit/credit card data, the original static PIN code (delivered by the bank for the initial activation of the card) together with the card and the user's biometrics. Fingerprint authentication triggers an internal dynamic PIN code algorithm which is with the same as that used for the generation of the dynamic PIN by the dynamic PIN authentication system that is connected to the card issuer's bank transaction system. From the moment when the biometric data is inputted, the PBD generates a dynamic PIN code that will be valid for a given amount of time (typically one to five minutes) and recognized upon an authentication request by the authentication server. Such a PIN code is to be used to authenticate a transaction on POS and/or ATM. The Dynamic PIN algorithm may include standard banking industry protocols such as Visa/IBM, triple DES (data encryption standards) encryption and PKI (public key infrastructure) encryption schemes to format the PIN in order for the Dynamic PIN to be transported transparently over the banking network and recognized on the server side using standard industry matching tools like a Hardware Security Module. On-line connection through a PC for e-banking and e-commerce transaction authentication can be done without user input besides biometrics recognition.

A debit/credit card with magnetic strip in a biometric protection system with the PBD may be used for transactions in a conventional way, without requiring changes to the banking protocols and network infrastructure. The debit/credit card is typically inserted into or swiped through a transaction terminal in the course of a purchase or other type of transaction. The holder may be requested to input a Dynamic PIN code displayed by the PBD 501 into the terminal in order to validate the transaction. If the Dynamic PIN code is required and correctly provided, the transaction is authenticated on the server side (Dynamic PIN Authentication System) and validated in a conventional manner by the Issuer Authorization System.

A debit/credit card may be used with POS and ATM terminals using the dynamic PIN code generated by the PBD 501 instead of the original static PIN associated to the debit/credit card by the card bank's issuer. In that scenario the server system will reconstruct the dynamic PIN by collecting user data and encryption keys stored in a central database and match them with the received Dynamic PIN.

If the fingerprint acquired by the fingerprint sensor 505 does not match that stored by the PBD 501, the PBD 501 may indicate an error message on the display 507 and stop the authentication process.

In one embodiment, multiple people can share a PBD 501, storing biometric data for each person on the PBD 501, which may be associated with some or all of the stored account data. Thus, for example, person A may be able to use account data for cards 1, 2, and 3 stored in the PBD 501 while person B may be able to use cards 4, 5, and 6. Therefore, persons A and B may both be able to use the PBD 501 to enable use of cards. Any combination of people and access to stored account data desired may be provided.

The PBD 501 may store account data for multiple cards MC as described above. A single static PIN code is associated with each of the account numbers contained in the account data. A Dynamic PIN code algorithm is used to generate a specific one time use PIN code specific to each account for each transaction. The biometrics recognition triggers the authentication-validation mechanism. In the situation that multiple account data of a plurality of users are stored, the PBD 501 further provides means for selecting a specific account of a specific user so as to generate a valid dynamic PIN code for the account in accordance with the selected account.

In one embodiment, the PBD 501 may further comprise self-destruction means, which is not shown, so that attempts to disassemble the PBD 501 destroy the stored biometric and/or the stored account data.

In a typical enrollment, after connecting the PBD 501 to the enrollment system (server), the holder may insert a magstripe debit/credit card or a smart card into the PBD 501 into an external reader or enter manually the information on a connected computer system, then may enter a PIN code or other authentication key associated with the magnetic strip debit/credit card. The enrollment system and the PBD 501 may use a public key infrastructure technique to encrypt and decrypt communications between them, so the PBD 501 and the enrollment system may each send their public keys to the other. Other encryption techniques may be used.

The enrollment system may then request identification from the PBD 501, typically requesting the MAC (Media Access Control) address of the PBD 501. Said MAC address is a hardware address that uniquely identifies each node (such as said PBD) of a network. The PBD 501 then may send the MAC address to the enrollment system, or the enrollment system may read the MAC address from the PBD 501. The enrollment system will typically look up the MAC address of the PBD 501 in a PBD database. In one embodiment, if the PBD 501 is not contained in the PBD database, then verification fails, and the PBD will clear the static data memory and close communications with the enrollment system, showing an error message such as "Invalid device" in the display 507 of the PBD 501. In another embodiment, if the PBD 501 is not contained in the PBD database of the enrollment system, then enrollment system will add the PBD 501 to the enrollment system database and complete verification.

If verification of the PBD 501 identity succeeds, then the enrollment system will typically send an enroll command to the PBD 501. The PBD 501 may then display a message requesting the holder to provide the biometric input data by placing a finger on the fingerprint sensor 505. The PBD 501 may use a message in the display 507 to instruct the holder to place the finger on the fingerprint sensor 505. If the PBD 501 succeeds in obtaining a fingerprint, the PBD will store the fingerprint in the biometric data memory 504 on the PBD 501 and then send an enrollment status of success or failure to the enrollment system. If enroll command fails, the PBD 501 may stop the enrollment operation, clear its memory, and close communications with the enrollment server, and then show a message such as "enrollment failed" on the display 507 to indicate the failure to the holder.

If enrollment succeeds, the enrollment system may indicate to the PBD 501 that it is ready to receive data from the PBD 501. The PBD 501 may then send information from the credit/debit card as well as card owner information to the enrollment system. Other information may be supplied as desired by the enrollment system from any useful source. However, the PBD does not send the biometric data stored in the biometric data memory 504 to the enrollment system. The enrollment system may then store the received card and customer data in an enrollment database which may be a separate database from the PBD database, and then the enrollment system sends one or more account data to the PBD 501.

The server may then send a message to the PBD 501 indicating enrollment has succeeded which the PBD 501 may display on the display 507. The PBD 501 stores the account data in the account data storage of the PBD 501. The illustrated actions are illustrative and exemplary, and other actions and ordering of actions may be used.

The enrollment system may be operated by a different entity from the issuer of any or all of the cards enrolled into the PBD 501. In a future enrollment transaction, the PBD 501 may be able to acquire additional account data from either the enrollment system or another issuer or other system. The stored biometric data is typically associated with each account data if a plurality of account data is provided to the PBD 501.

In one embodiment, the PBD 501 may be used for e-commerce, when connected to a network (such as the Internet) using wireless or wired communications.

Hereinafter, the authentication system according to the present invention will be described in detail with reference to FIG. 6.

The authentication system according to the present invention comprises the PBD 501, a card issuer's bank server 601 and a dynamic PIN code authentication server 602. The system of the present invention may further comprise other component or sub-systems. In one embodiment of an electronic transaction using a banking card 609, the PBD 501 may be directly connected via, for example, USB/Firewire/Bluetooth to a PC 603 that is connected with the card issuer's bank 601 via the Internet 604. Prior to the electronic transaction using the banking card 609, the initialization step, the registration step and the enrollment step are performed in accordance with the foregoing description taken in conjunction with FIGS. 2, 3 and 4, respectively. The card holder then inputs fingerprint data via the PBD 501, and the PBD 501 compares the inputted fingerprint data with the fingerprint data stored in the biometric data memory 504 of the PBDD 501. If no match is found in a predetermined time (typically dozens of seconds), the PBD 501 may display error information, such as "Invalid fingerprint" in the display 507. If a match is found in the predetermined time, a dynamic PIN code may be generated using the dynamic PIN algorithm and be displayed in the display 507. Afterwards, the card holder inputs the PIN code displayed in the display 507 into, for example, an ATM 607, a POS 606 or would-be terminals of a mobile telephone 608, and the dynamic PIN authentication system 602 on the card issuer's bank 501 side authenticates the dynamic PIN code inputted by the card holder so as to complete authentication of the transaction. The transaction is made valid if authentication is passed, otherwise the transaction request is rejected.

Figure 6:
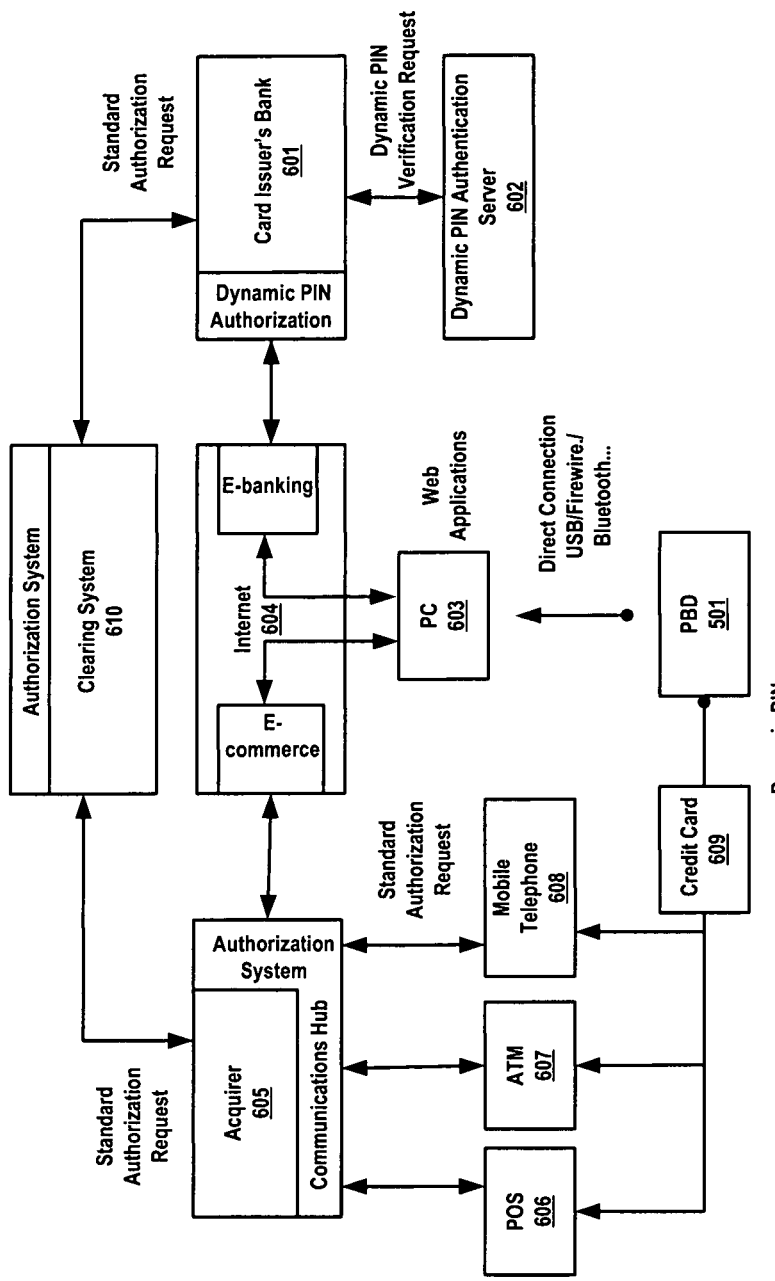
FIG. 6 is a schematic view of a system according to the present invention.

FIG. 6 further shows an acquirer 605 and the clearing system 610 (for example, Union pay of China) so as to completely illustrate the conventional electronic transaction mode. Additionally, the two basis electronic transaction modes, i.e. e-Banking and e-Commerce, are also shown as examples in this figure. Since the present invention does not change working modes of other portions, description thereof is omitted for the purpose of conciseness.

Figure 7:
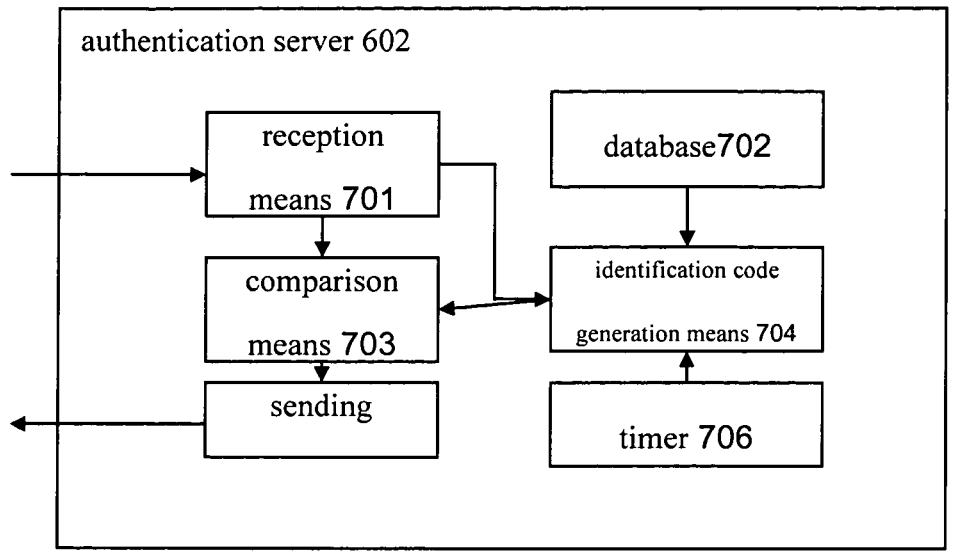
FIG. 7 is a schematic view of a server according to an embodiment of the present invention.

FIG. 7 shows an internal structure of the authentication server 602. As shown in the figure, the authentication server 602 comprises: reception means 701, a database 702, comparison means 703, identification code generation means 704, sending means 705 and a timer 706.

Upon the receipt of the authentication request, the reception means 701 of the authentication server 602 receives a PIN code to be authenticated and relevant static data. The static data may be all or part of static data needed for the generation of the PIN code in the local device, such as comprising the user's account information, the MAC address of the local device and/or the set of keys for the generation of PIN. Since there might be a huge data amount of the static data used for the generation of the dynamic PIN code, the transmission of all the data via the communications system of a bank might occupy large resources and is prone to leakage. Thus, only necessary static data is received, such as the account recorded on the magnetic card or the like. Other additional static data for the generation of the dynamic PIN code may be pre-stored in the database 702 of the authentication server 602. The additional static data stored in the database 702 corresponds to the accounts one by one, and corresponding additional static data may be searched based on the received account. The identification code generation means 704 calculates a current dynamic PIN code based on such static data as the received account, the additional static data searched from the database 702 and current time from the timer 706 and by using the same dynamic PIN algorithm as the local device. The comparison means 703 compares the dynamic PIN code generated by the identification code generation means 704 with the PIN code received by the reception means. If these two PIN codes match each other, then authorization information is sent by the sending means 705, otherwise authorization rejection information is sent by the sending means.

To sum up, with the dynamic PIN code generation device of the present invention, the user can dynamically generate a PIN code for authentication during transactions such as ATM withdrawal, without a worry that the PIN code will be forgotten. Furthermore, the term of validity of the generated PIN code is so short as it is merely enough to complete a current transaction, and therefore, the user does not need to worry that the card will be stolen by other people. The dynamic PIN code generation device of the present invention may be designed as a portable device in the size of a credit card or be integrated onto a mobile telephone, a PDA and other portal device. Since the dynamic PIN code generation device of the present invention generates a dynamic PIN code after matching biometric data, even if the dynamic PIN code generation device is lost or stolen, other people cannot acquire the dynamic PIN code from the device. Therefore, the dynamic PIN code generation device has quite high security which is further strengthened by the self-destruction means which is internally arranged in the dynamic PIN code generation device to prevent disassembly.

As the embodiments of the present invention have been described with reference to the accompanying drawings, it is to be understood that the present invention is not limited to the disclosed exemplary embodiments. The scope of the claims is to be accorded the broadcast interpretation so as to encompass all such modifications and equivalent structures and functions.

I claim:

1. A method for identity authentication using biometrics in an authentication system that at least comprises a local device and an authentication server, said method comprising:
    an input step of inputting biometric data into said local device via a biometric sensor;
    a match step of matching said inputted biometric data with original biometric data pre-stored in a memory of said local device;
    a first identification code generation step of generating a first identification code in said local device if said inputted biometric data is matched with said biometric data pre-stored in the memory; and
    an authentication step of sending said first identification code to the authentication server so that the authentication server authenticates said first identification code to authorize said system to perform authorized operations,
    wherein said authentication step further comprises the steps of
        receiving an authentication request by the authentication server;
        receiving said first identification code;
        generating a second identification code by using the same method as the first identification code generation step; and
        comparing the received first identification code with the second identification code to determine whether to authorize performance of the authorized operations,
    wherein the step of generating the second identification code further comprises the steps of
        reading current time information and static data of an authenticated user; and
        generating the second identification code based on the read time information and static data, and
    wherein time is cut into a plurality of successive time slices with a predetermined time interval, and identification codes generated in a same time slice are identical to each other while identification codes generated in different time slices are different from each other.

2. The method according to claim 1, wherein said first identification code generation step generates the first identification code in accordance with a current time and static data.

3. The method according to claim 1, wherein if the time interval between the moments of the generated first identification code and second identification code is less than a predetermined time interval, then the generated first identification code and second identification code are matched with each other, and
    if the time interval between the moments of the generated first identification code and second identification code is more than a predetermined time interval, then the generated first identification code and second identification code are not matched with each other.

4. The method according to claim 1, wherein said authentication step are implemented by POS or ATM, and said first identification code is input and sent to said authentication server through POS or ATM.

5. A device for identity authentication using biometrics, said device comprising:
    a memory for pre-storing original biometric data;
    a biometric sensor for receiving inputs of biometric data;
    match means for matching the biometric data inputted through the biometric sensor with the biometric data pre-stored in said memory;
    first identification code generation means for generating a first identification code if said inputted biometric data is matched with said biometric data pre-stored in said memory; and
    a timer for providing clock information,
    wherein said first identification code generation means generates the first identification code in accordance with time information on a current moment provided by the timer and static data,
    wherein said first identification code generation means divides time into a plurality of successive time slices with a predetermined time interval, judges which time slice the time information on a current moment provided by said timer belongs to and generates an identification code corresponding to said time slice, and
    wherein identification codes generated in a same time slice are identical to each other while identification codes generated in different time slices are different from each other.

6. The device according to claim 5, wherein the term of validity of said generated first identification code is a predetermined time interval, and after said predetermined time interval from the moment when said first identification code is generated, said identification code becomes invalid.

7. The device according to claim 5, further comprising self-destruction means for destroying the biometric stored in said device or the stored static data in attempts to disassemble the device.

8. The device according to claim 5, wherein said static data comprises user data of a plurality of users, a user selects needed user data during generation of the first identification code, and said first identification code generation means generates the first identification code in accordance with the user data selected by the user.

9. The device according to claim 5, wherein said first identification code is used in the authenticating procedure implemented by POS or ATM, and said first identification code is input and sent to an authentication server through POS or ATM.

10. A server for identification authentication, comprising:
    input means for receiving an authentication request, static data and a first identification code to be authenticated;
    second identification code generation means for generating a second identification code based on the static data upon receipt of the authentication request;
    comparison means for comparing the received first identification code with the generated second identification code;
    sending means for returning authorization information if a comparison result of said comparison means indicates that the first identification code is matched with the second identification code, otherwise rejecting authorization; and
    a timer for providing clock information, wherein said second identification code generation means generates the second identification code in accordance with time information on a current moment provided by the timer and the static data, wherein said second identification code generation means divides time into a plurality of successive time slices with a predetermined time interval, judges which time slice the time information on a current moment provided by said timer belongs to and generates an identification code corresponding to said time slice, and wherein identification codes generated in a same time slice are identical to each other while identification codes generated in different time slices are different from each other.

11. The server according to claim 10, further comprising a database for storing additional static data of each user, wherein said second identification code generation means extracts corresponding additional static data from the database based on the received static data and generates said second identification code based on said extracted additional static data or received static data.

12. A system for identification authentication using biometrics, wherein said system comprises the device according to claim 5 and the server according to claim 10.

13. The system according to claim 12, wherein timing information of the timer of said device is consistent with timing information of the timer of said server, and said device and said server use a same algorithm to generate identification codes.

* * * * *